United States Patent

Sobajima et al.

[11] Patent Number: 6,015,857
[45] Date of Patent: *Jan. 18, 2000

[54] PROPYLENE RESIN COMPOSITIONS

[75] Inventors: Yoshihiro Sobajima; Masashi Shimouse; Masahide Hamaura; Akira Yamaji, all of Yokkaichi, Japan

[73] Assignee: Japan Polychem Corporation, Tokyo-to, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/968,345

[22] Filed: Nov. 12, 1997

[30] Foreign Application Priority Data

Nov. 26, 1996 [JP] Japan ..................................... 8-314709

[51] Int. Cl.[7] .............................. C08L 53/00; C08L 23/00
[52] U.S. Cl. ............................... 524/451; 525/95; 525/98; 524/230
[58] Field of Search ............................. 524/451; 525/95, 525/98

[56] References Cited

FOREIGN PATENT DOCUMENTS

| 0 496 625 | 7/1992 | European Pat. Off. . |
|---|---|---|
| 0 531 054 | 3/1993 | European Pat. Off. . |
| 0 695 781 | 2/1996 | European Pat. Off. . |
| 0 774 489 | 5/1997 | European Pat. Off. . |
| 2 309 973 | 8/1997 | United Kingdom . |
| 2 312 426 | 10/1997 | United Kingdom . |

*Primary Examiner*—Mark L. Warzel
*Attorney, Agent, or Firm*—Oblon, Spivak, McClelland, Maier & Neustadt, P.C.

[57] ABSTRACT

A propylene resin composition having excellent physical property balance (heat resistance and impact strength at low temperature), and excellent injection molding processability as well as excellent paintability is provided, which propylene resin composition comprises component (a): a propylene-ethylene block copolymer comprising 85–95% by weight of a crystalline polypropylene homopolymer portion (unit A) and 5–15% by weight of an ethylene-propylene random copolymer portion (unit B) having an ethylene content of 30–60% by weight, the melt flow rate of the total component (a) being 50–500 g/10 min in an amount of 100 parts by weight, component (b): talc having an average particle diameter of 1.5–10 $\mu$m and an average aspect ratio of 4 or more in an amount of 10–60 parts by weight, and component (c): an ethylene-1-octene copolymer comprising 20–50% by weight of 1-octene, and having a density of 0.86–0.89 g/cm$^3$ and a tensile strength at break of 10 MPa or more in an amount of 10–60 parts by weight.

8 Claims, No Drawings

PROPYLENE RESIN COMPOSITIONS

BACKGROUND OF THE INVENTION

1. Field of the Invention

The present invention relates to novel propylene resin compositions having excellent physical property balance (high heat resistance and impact strength at low temperature), injection molding processability, and paintability. The present invention relates to propylene resin compositions suitable for the material of a variety of industrial parts such as those of automobiles.

2. Background Art

Composite propylene resin compositions reinforced with components such as talc and a rubber have hitherto been used extensively for automobile parts such as a bumper, an instrument panel, a fan shroud, or a glove box, or for parts of domestic electric appliances such as a television, a VTR or a washing machine with making the best use of their excellent properties such as moldability, mechanical strength, paintability and profitability.

Recently, the level of required performances such as the formation of a molded part with a thinner wall or with a more complicated design has rapidly become higher in association with the higher facility of the aforementioned applications and the tendency of the products to become larger in size. For such tendency of the required performances to become larger, a variety of ideas have been proposed for the composite propylene resin compositions comprising polypropylenes, rubber components and talc such that the performance of an ethylene-propylene copolymer as the rubber components has been improved, or the talc particles have been made much finer.

However, little effective solutions have been proposed for improving the performance to a much higher level, for example the problem of exhibiting the performance which satisfies both high physical property balance (high heat resistance and impact strength at low temperature) and more excellent injection molding processability (especially, excellent fluidability and mold handling ability as well as good appearance of a molded product which hardly generates flow mark), while keeping excellent paintability which requires no degreasing treatment with trichloroethane which is usually carried out.

SUMMARY OF THE INVENTION

The object of the present invention is to provide a propylene resin composition with high physical property balance (high heat resistance and impact strength at low temperature) and more excellent injection molding processability (especially, excellent fluidity and ease of handling of a mold, as well as good appearance of a molded product which hardly generates flow mark), while keeping excellent paintability which requires no degreasing treatment with trichloroethane.

The present inventors have found that a propylene resin composition prepared by blending a particular propylene-ethylene block copolymer with a particular talc and a particular ethylene-1-octene copolymer, and optionally a particular fatty amide or a derivative thereof in a particular ratio requires no degreasing treatment with trichloroethane and has high level paintability, high physical property balance (high heat resistance and impact strength at low temperature) and more excellent injection molding processability (especially, excellent fluidity and easy handling of a mold as well as good appearance of a molded product which hardly generates flow mark). The present invention has been accomplished on the basis of the discovery.

Accordingly, the propylene resin composition according to the present invention comprises:

component (a) which is a propylene-ethylene block copolymer comprising 85–95% by weight of a crystalline polypropylene homopolymer portion as a unit A, and 5–15% by weight of an ethylene-propylene random copolymer portion as a unit B having an ethylene content of 30–60% by weight, the melt flow rate of the total component (a) being 50–500 g/10 min, in an amount of 100 parts by weight;

component (b) which is talc having an average particle diameter of 1.5–10 $\mu$m and an average aspect ratio of 4 or more, in an amount of 10–60 parts by weight, and component (c) which is an ethylene-1-octene copolymer containing 20–50% by weight of 1-octene, and having a density of 0.86–0.89 g/cm$^3$ and a tensile strength at break of 10 MPa or more, in an amount of 10–60 parts by weight.

DETAILED DESCRIPTON OF THE INVENTION

[I] Propylene resin composition (1) Components (A) Propylene-ethylene block copolymer [component (a)]

(a) Structure

The propylene-ethylene block copolymer, component (a), used in the propylene resin composition of the present invention is a block copolymer comprising 85–95% by weight, preferably 87–95% by weight, and more preferably 90–94% by weight, of a crystalline polypropylene homopolymer portion, unit A, prepared by the homopolymerization of propylene, and 5–15% by weight, preferably 5–13% by weight, and more preferably 6–10% by weight, of an ethylene-propylene random copolymer portion, unit B, prepared by the copolymerization of ethylene with propylene and having an ethylene content of 30–60% by weight, preferably 33–60% by weight, and more preferably 34–55% by weight, melt flow rate which will be referred to hereinafter as "MFR" at 230° C. & 2.16 kg of the total component (a) being 50–500 g/10 min, preferably 50–90 g/10 min, and more preferably 50–80 g/10 min.

In this context, the density of the unit A is preferably 0.9070 g/cm$^3$ or more, and more preferably 0.9080 g/cm$^3$ or more, in order that a higher rigidity/stiffness under heat may be obtainable.

If the content of the aforementioned crystalline propylene homopolymerization portion (unit A) is far lower than the range described above rigidity stiffness may be insufficient. On the other hand, if the content is far above the range described above, paintability and impact strength may be poor.

In addition, if the ethylene content of the ethylene-propylene copolymer (unit B) is far lower than the range described above, impact strength may be insufficient.

On the other hand, if the content is far above the range described above, heat resistance may be poor.

Furthermore, if the MFR of the total component (a) is far lower than the range described above, injection molding processability may be poor. On the other hand, if the MFR is far above the range described above, impact strength may be unsatisfactory.

Measurement

The content of the unit B in the propylene-ethylene block copolymer is the value obtained from the backward calculation of the weight of a solid which is prepared by the procedure comprising dipping and dissolving 2 g of a sample in 300 g of a boiling xylene, cooling the solution to room temperature to crystallize a solid phase which is filtered through a glass filter and dried.

The ethylene content is the value measured by the infrared spectrophotometry or an equivalent means.

Adjustment of MFR

The MFR of the total component (a), propylene-ethylene block copolymer, is preferably in the range of 50–90 g/10 min, particularly 50–80 g/10 min, in order to provide good physical property balance and injection molding processability.

The MFR of a propylene-ethylene block copolymer is usually adjusted through the control of various polymerization conditions such as temperature and pressure on polymerization. An alternative method for providing the block copolymers of the MFR values controlled includes a method comprising treating the polymer with various peroxides. The polymer treated with this method may be usually inappropriate for the use as the resin compostion of the present invention, but the block copolymer so treated can be comprised in the composition in such a small amount that the effect of the present invention will not be inhibited extremely.

In addition, the MFR is measured in accordance with JIS-K7210 at 230° C. and under 2.16 kg load.

(b) Preparation of the propylene-ethylene block copolymer

The propylene-ethylene block copolymer as the component (a) is prepared by the slurry polymerization, the gas phase polymerization or the liquid phase bulk polymerization in the presence of a highly stereoregulating catalyst, and it is preferably prepared by the gas phase polymerization in consideration of paintability or cost. In addition, as the polymerization method, either of the batch polymerization or the continuous polymerization may be employed, but it is more preferred to employ the continuous polymerization method.

In view of the quality of the propylene-ethylene block copolymer produced, it is preferred to form first the unit A by the homopolymerization of propylene, followed by the formation of the unit B by the random polymerization of propylene and ethylene.

Specifically, the propylene-ethylene block copolymer can be prepared by the homopolymerization of propylene in the presence of a catalyst which is a combination of (i) a solid component formed by contacting magnesium chloride with titanium tetrachloride, an organic acid halide and an organosilicon compound with (ii) an organoaluminum compound, followed by, as the continuation of the polymerization, the random copolymerization of propylene and ethylene.

Also, the propylene-ethylene block copolymer can comprise a further comonomer or comonomers copolymerized therewith such as an α-olefin including 1-butene or a vinyl ester including vinyl acetate, unless the effect of the present invention is not impaired excessively.

(A) Talc [component (b)]

The talc as the component (b) used in the propylene resin composition of the present invention is the one having the average diameter of 1.5–10 μm, preferably 1.5–8 μm, and more preferably 1.5–6 μm, and the average aspect ratio of 4 or more, preferably 5 or more, and more preferably 6 or more, and 100 or less. The talc other than those aforementioned is not suitable for the component because of the poor physical property balance or injection processability of the propylene resin composition formed.

Furthermore, it is preferred to use the talc having a total length of substantially 15 μm or less from the viewpoint of improving the physical property balance in the propylene resin composition formed.

The term "substantially" in the total lenght of the talc means that most of the talc particles are within the range described above, and it also means that some talc particles other than those described above can be contained to such a degree that the effect of the present invention will not be impaired excessively.

The talc to meet the requirement in the present invention is prapared by grinding a talc ore with an impact grinder or a micronmill-type grinder or by further milling with a micronmill or a jet mill, followed by classification with a cyclone or a micron separator. The aforementioned ore is preferably the one produced in China because of its low content of metal impurities.

In this connection, a talc which has been subjected to surface treatment with 0.2–3 parts of a metal salt represented by the following chemical formula [1] per 100 parts by weight of the talc is preferred since the physical property balance or the injection molding processability of the propylene resin composition of the present invention may be further improved:

(RCOO)$_2$X wherein X represents Zn, Mg or Ca, and R represents a monovalent hydrocarbon group having a molecular weight of 290–500, preferably 300–450.

The metal salt used for the surface treatment of the talc which is represented by the chemical formula [1] described above specifically includes zinc montanate, magnesium montanate, calcium montanate, zinc behenate, magnesium behenate, calcium behenate, and the like.

Metal salts other than those represented by the chemical formula [1] exhibit no such effects as described above and thus are not suitable for the surface treatement.

The method of the surface treatment of talc with the matal salts described above includes, but not limited to, the method of blending talc powder which has been previously ground and classified with a certain amount of the metal salt by a high-speed mixer. Further method includes the surface treatment concurrently with the preparation of the resin composition wherein the blending and mixing of the metal salt and the talc powder are conducted by adding the two components to the mass during the kneading and granulation of the propylene resin composition of the present invention.

It suffices that the amount of the metal salt used in the surface treatment is in the range of 0.2–3 parts by weight per 100 parts by weight of the starting talc powder. If the amount is less than 0.2 part by weight, the physical property balance or injection molding processability of the resin composition formed is improved only insufficiently, and if the amount exceeds 3 parts by weight, heat resistance is undesirably insufficient.

Furthermore, it is possible to use an either of untreated talc powder or the surface treated talc powder described above which have been compressed and deaerated at a compression ratio of 1.10 or more, preferably 1.50 or more, and particularly 2.00–5.00 to provide an apparent specific volume of 2.50 ml/g or less, preferably 2.20 ml/g or less, and more preferably 0.90–2.20 ml/g, the so-called compressed talc or compressed surface treated talc.

In the case of using the compressed talc or the compressed surface treated talc, not only high productivity can be obtained in the production of the resin composition or granulation of the resin composition, but also improvements in view of environmental pollution can be obtained which would otherwise take place when talc powder is not compressed including possible contamination by the talc powder of products on the manufacturing lines nearby. Other advantages may be obtainable such that delivery cost can be saved because of the low bulk of the compressed talc or the compressed surface treated talc.

In this connection, if the apparent specific volume is in the range of less than 0.90 ml/g, the dispersibility of the talc particles into the resin during granulation tends to be deteriorated.

The method of preparing the compressed talc or the compressed surface treated talc includes, but not limited to, the following.

First, untreated or surface treated talc powder as the starting material is appropriately deaerated slightly in a decompression device, then fed into a hopper with a built-in screw, transferred to a roll compacter provided in the lower level, and compressed at the roll to produce small pieces, which roll compacter comprises a mating two rolls with a desired clearance therebetween.

In this connection, water or various chemical binders can be used for improving the adhesion of the talc particles compressed, but the medium is not rather used to ensure the good dispersibility of the talc into the resin during granulation.

In addition, a method can be used in which the untreated starting talc which has been compressed and the metal salt for treating the surface of talc may be blended and mixed with the remainder of the composition such as the component (a) under granulation.

Measurement

The average particle diameter of the talc described above is a value measured with a laser-light scattering particle size distribution analyzer, which is preferably an apparatus of Model LA-500 (Horiba Seisakusho, Japan) because of its excellent precision of measurement.

Also, the diameter, thickness and aspect ratio of the talc can be measured by the microscopic method.

The aspect ratio can be calculated by dividing the average diameter by the average thickness.

In addition, the compression ratio is calculated from the following equation:

The compression ratio=[apparent specific volume of talc before compression]/[apparent specific volume of talc after compression]

Furthermore, the apparent specific volume is the value measured by the standing method prescribed in JIS-K5101.

(C) Ethylene-1-octene copolymer [component (c)]
(a) Structure

The ethylene-1-octene copolymer as the component (c) composing the propylene resin composition of the present invention contains 20–50% by weight, preferably 20–45% by weight, and more preferably 20–40% by weight of 1-octene, and has a density of 0.86–0.89 g/cm$^3$, preferably 0.865–0.885 g/cm$^3$, and more preferably 0.865–0.88 g/cm$^3$ and a tensile strength at break of 10 MPa or more, preferably 12 MPa or more, and more preferably 15–50 MPa.

If the content of 1-octene is far lower than the range described above, the paintability and the impact strength of the resin composition may be poor. On the other hand, if the content is far above the range described above, not only the heat resistance is lowered, but also the shape of the polymer is hardly maintained in pellets and the production handling is extremely lowered in the preparation of the propylene resin composition of the present invention. Thus, such the ranges of the 1-octene contents outside those specified hereinabove are not suitable for the use in the resin composition.

Furthermore, if the density is excessively high, the paintability and the impact strength is poor, and if excessively low, the composition is hardly pelletized, so that neither of the copolymers having such densities are suited for the composition.

On the other hand, if the tensile strength at break is less than 10 MPa, the physical property balance and the appearance of the molded article are poor, so that the copolymer is not suited for the composition.

In this connection, the ethylene-1-octene copolymer having an ethylene triad sequency measured by $^{13}$C-NMR in the range of 55–70%, particularly 57–70% is preferred in view of the paintability and the impact strength.

Similarly, the ethylene-1-octene copolymer having a glass transition temperature of −52° C. or less, particularly −55° C. or less, is preferred in view of the paintability and the impact strength. Also, the copolymer has preferably the MFR (230° C., 2.16 kg) in the range of 2 g/10 min or less in view of the impact strength and the appearance of the molded article.

Measurement

The content of the 1-octene described above is the value measured by the infrared spectrophotometry or the $^{13}$C-NMR spectrophotometry. In general, the value obtained by the infrared spectrophotometry tends to be smaller (about 10–50%) as the copolymer has a lower density as compared with the one obtained by the $^{13}$C-NMR spectrophotometry.

Also, the density is the value measured in accordance with JIS-K7112.

The tensile strength at break is a strength at break in which a tensile dumbbell (length between gauge marks=10 mm, gauge mark interval=5 mm) is punched out from a 2 mmt sheet having the component pellet press-molded therefrom at 200° C. and measured at a tensile rate of 50 mm/min (at 23° C.).

Furthermore, the ethylene triad sequency described above is the value which is obtained by calculating the ratio of the structural portion formed by the consecutive six methylene groups in an alkyl chain having six carbon atoms with the areal strengths of signals in $^{13}$C-NMR according to the method described on page 38 in NIPPON GOMU KYOKAISHI, Vol. 60, No. 1 (1987), and the glass transition temperature described above is the value of the measurement (20° C./min) with a differential scanning calorimeter (referred to hereinafter as DSC; for example RDC-220, SEIKO ELECTRIC INDUSTRIES, JAPAN).

The MFR described above is the value which is measured in accordance with JIS-K7210 (230° C., 2.16 kg).

(b) Preparation of ethylene-1-octene copolymer
Polymerization method

As the ethylene-1-octene copolymer as the component (c) used for the propylene resin composition of the present invention, it is preferred to use those obtained with a metallocene catalyst described below because of its excellent physical property balance and paintability of the propylene resin composition of the present invention produced, although those prepared with various Ziegler catalysts can be used as well. A variety of polymerization methods can be employed for the preparation. Specifically, there can be mentioned the gas phase fluidized bed method, the solution method, the slurry method, the high pressure polymerization method, and the like.

A small amount of a diene component such as dicyclopentadiene or ethylidenenorbornene can be further copolymerized in the copolymer.

Polymerization catalyst

The ethylene-1-octene copolymer as the component (c) used for the propylene resin composition of the present invention can be prepared with a metallocene catalyst (single site catalyst).

While the catalyst which is used in the present invention and called a metallocene catalyst is not necessarily required to contain an alumoxane, preferably is a catalyst which is the combination of the metallocene compound and an alumoxane, the so-called Kaminsky catalyst, and includes those described in for example, Japanese Patent Laid-Open Publication Nos. 19309/1983, 95292/1984, 35005/1985, 35006/1985, 35007/1985, 35008/1985, 35009/1985, more preferably those in Japanese Patent Laid-Open Publication No. 163088/1991, European Patent Laid-Open Publication No. 420436, U.S. Pat. No. 5,055,428, and more preferably in International Publication No. 91/04257.

(D) Other adjuncts (optional components) [component (d)]

In the propylene resin composition of the present invention, optional adjuncts or blending components described below can be incorporated in addition to the essential components (a)–(c) described above with the proviso that the effect of the present invention will not be excessively impaired or in order to further improve performances.

Specifically, there can be mentioned adjuncts materials such as a pigment for coloring, an anti-oxidant, an antistatic agent, a flame-retardant, a photo-stabilizer, a nucleating agent, a variety of resins other than the components (a)–(c) described above, a variety of rubbers, a variety of fillers, and a variety of adjucts.

Among these adjuncts, the blending of a variety of rubber components such as an ethylene-propylene copolymer rubber, an ethylene-1-butene copolymer rubber, an ethylene-propylene-diene copolymer rubber, and a styrene-ethylene-butylene-styrene copolymer rubber are effective for the improvement of injection molding efficiency of the resin composition of the present invention including impact strength, appearance of an molded article, paintability, smooth charging into a mold, mold opening and unmolding. Also, the blending of a hindered amine stabilizer is effective for resistance to weather and durability.

In particular, the following fatty amides or derivatives thereof are the particularly preferred ones among the component (d) described above.

Such fatty amides or derivative thereof include saturated or unsaturated fatty amides having 3–30 carbon atoms. Specifically, there can be mentioned stearylamide, oleylamide, erucylamide, laurylamide, behenylamide, ethylenebisstearylamide, and the like.

The resin composition having these additives added thereto exhibits good moldabilities such as smooth charging, mold opening and unmolding of a molded product in injection molding.

(2) Blending ratio

The components (a)–(c) and optionally the component (d) which are incorporated into the propylene resin composition of the present invention are incorporated on the basis of 100 parts by weight of the component (a) in the following amounts.

Component (b): talc

The talc as the component (b) which is incorporated into the propylene resin composition of the present invention is incorporated in a blending ratio of 10–60 parts by weight, preferably 10–50 parts by weight, and more particularly 10–40 parts by weight to 100 parts by weight of the component (a).

If the blending ratio is less than the range described above, the heat resistance is poor, and if it exceeds the range described above, the impact strength, the fluidity as the injection molding processability, and the appearance of the molded product are poor, so that such blending ratios are not practical.

Component (c): ethylene-1-octene copolymer

The ethylene-1-octene copolymer as the component (c) which is incorporated into the propylene resin composition of the present invention is incorporated in a blending ratio of 10–60 parts by weight, preferably 15–55 parts by weight, and more preferably 20–50 parts by weight to 100 parts by weight of the component (a).

If the blending ratio is less than the range described above, the impact strength and paintability are poor, and if it exceeds the range described above, the heat resistance and the injection molding processability, especially the appearance of the molded product are poor, so that such blending ratios are not practical. Component (d): other blending components (optional components)

The fatty amide or a derivative thereof as the component (d) which is incorporated into the propylene resin composition of the present invention is incorporated in a blending ratio of 0.1–1 part by weight, preferably 0.2–0.8 part by weight, and more preferably 0.2–0.5 part by weight to 100 parts by weight of the component (a).

If the blending ratio is less than the range described above, the appearance of the molded product and moldability tend to be poor, and if it exceeds the range described above, the heat resistance and the paintability are poor, so that the blending ratio should be preferably within the range described above.

(3) Preparation of the propylene resin composition (A) Kneading and granulation

The components (a)–(c), and optionally the component (d), are incorporated at the blending ratios described above with a conventional kneading machine such as a uniaxial extruder, a biaxial extruder, a Banbury mixer, a roll mixer, a Brabender-Plastograph, or a kneader for kneading and granulation to give the propylene resin composition of the present invention.

In this case, it is preferred to select a kneading and granulating method which makes the good dispersion of the components, and thus a biaxial extruder is preferably used for kneading and granulation. In the case of kneading and granulation, the components (a)–(c), and optionally the component (d), may be kneaded at the same time, or in order to improve the performance of the composition, the components (a)–(c), and optionally the component (d), can be divided into portions, and a part or all of the components (a) and (b) are first kneaded before the remaining parts of the components (a)–(d) are kneaded and granulated, or all of the components can be also blended in the master batch fashion.

(B) Molding of the propylene resin composition

The propylene resin composition thus obtained can be molded into a variety of molded products by the injection molding (including gas injection molding) or the injection compression molding (press injection).

[II] Uses

The propylene resin composition of the present invention thus obtained maintains excellent paintability which requires no degreasing treatment with a degreasing agent which is mostly trichloroethane and exhibits high physical property balance (heat resistance and impact strength at low temperature) and more excellent injection molding processability (specifically, excellent fluidity and handling of a mold as well as good appearance of a molded product which hardly generates flow mark), so that it has performances satisfactory for a molding material for a variety of industrial articles or parts thereof including automobile parts such as a bumper, an instrument panel, or a garnish or for the parts of domestic electric appliances such as a television case.

EXAMPLES

The propylene resin composition of the present invention is further described in detail below with reference to Examples and Comparative Examples, but the present invention is not limited by these Examples and Comparative Examples.

[I] Starting materials

Starting materials herein are shown below.

(1) Component (a) each in the form of pellets to which a anti-oxidant has been incorporated selected from:

a-1: a propylene-ethylene block copolymer prepared by the gas phase polymerization which contains 93% by weight of the unit A having a density of 0.9092 g/cm$^3$ and 7% by weight of the unit B having an ethylene content of 45% by weight, and has a polymerization MFR of the total component (a) of 70 g/10 min;

a-2: a propylene-ethylene block copolymer prepared by the gas phase polymerization which contains 90% by weight of the unit A having a density of 0.9088 g/cm$^3$ and 10% by weight of the unit B having an ethylene content of 55% by weight, and has a polymerization MFR of the total component (a) of 5 g/10 min, of which MFR has been adjusted to 45 g/10 min with 1,3-bis(tert-butyperoxyisopropyl)benzene.

(2) Component (b) selected from:

b-1: talc substantially having a total length of 15 μm or less, an average particle diameter of 5.7 μm, and an average aspect ratio of 6;

b-2: talc substantially having a total length of 15 μm or less, an average particle diameter of 4.5 μm, and an average aspect ratio of 6, of which surface has been treated with 1.2 parts by weight of zinc behenate per 100 parts by weight of the component (b);

b-3: compressed surface-treated talc having an apparent specific volume of 1.75 ml/g prepared by compression deaeration of the component (b-2) described above at a compression ratio of 2.5;

b-4: untreated talc having an average particle diameter of 11.5 μm, and an average aspect ratio of 5.

(3) Component (c) either in the form of pellets, selected from:

c-1: an ethylene-1-octene copolymer prepared by the solution polymerization method in the presence of a metallocene catalyst which contains 25.5% by weight of 1-octene (determined by infrared spectrophotometry), and has a density of 0.871 g/cm$^3$ and a tensile strength at break of 18.5 MPa (in this connection, the ethylene triad sequency is 64%, the glass transition temperature is −57.8° C., and MFR is 1.0 g/10 min);

c-2: an ethylene-1-octene copolymer prepared by the solution polymerization method in the presence of a metallocene catalyst which contains 22.2% by weight of 1-octene (determined by infrared spectrophotometry), and has a density of 0.870 g/cm$^3$ and a tensile strength at break of 6.8 MPa; and c-3: an ethylene-propylene copolymer prepared by the solution polymerization method in the presence of a vanadium catalyst which contains 26.5% by weight of propylene (determined by infrared spectrophotometry), and has a density of 0.861 g/cm$^3$ and a tensile strength at break of 1.8 MPa.

(4) Component (d) selected from:

d-1: erucylamide; and d-2: oleylamide.

[II] Evaluation method

Evaluation was carried out by the method described below.

[Physical property balance]

<Thermal deformation temperature: heat resistance>

It was measured on an injection molding test piece in accordance with JIS-K7207 (anealing=100° C., 30 minutes).

<Dart impact strength>

On a test piece of 120×100 mm cut out of a sheet which has been molded for the judgment of its appearance described hereinafter was dropped a dart having a diameter of 20 mm and a load of 3 kg from the height of 2.5 m to measure impact absorption energy. The measurement temperature is −30° C.

[Injection molding processability]

<Moldability>

Use was made of a screw in-line type injection molding machine, to form a box (170×100×50×2 mm, pin point gate), and the easiness of molding such as charging property or the opening state of a mold was judged and evaluated on the basis of the following criteria.

The molding conditions in this case comprise a molding temperature of 230° C., an injection pressure of 800 kg/cm$^2$, and a mold cooling temperature of 40° C.

⊚: smooth in charging, of no problem in mold opening and unmolding of a box formed, and easy in molding;

○: of no problem in charging and mold opening, and unmolding of a box formed with a little difficulty; and ×: little problem in charging, but difficult in mold opening and unmolding of a box formed, and difficult in molding.

<Appearance>

Use was made of a screw in-line type injection molding machine to form a sheet (350×100×2 mm, pear emboss, pin point gate), the presence and conspicuousness of the flow mark (wave flow pattern) on the surface was observed with a naked eye and evaluated on the basis of the following criteria.

The molding conditions in this case comprise a molding temperature of 230° C., an injection pressure of 600 kg/cm$^2$, and a mold cooling temperature of 30° C.

⊚: very good for practical use with no or only slight flow marks;

○: of no problem for practical use with a few flow marks;

Δ: of problem for practical use due to the conspicuous flow marks which remain in parts; and ×: impossible for practical use due to the generation of flow marks all over the surface or formation of white powder all over the surface.

[Paintability]

<Primer and paint>

A primer for a melamine alkyd paint and a melamine alkyd paint were used.

<Painting method>

A molded plate with no preliminary treatment was coated by a spray-gun first with a primer to a thickness of about 30 μm, followed by baking the primer, and then a paint was coated to a thickness of about 30 μm.

<Baking treatment condition>

At a temperature of 140° C. for 30 minutes. After the painting, the product was left standing at room temperature for 48 hours.

<Peel strength test>

The surface of the coated test piece after baking was cut with a single-edged blade into linear lines at an interval of 10 mm, and the tip of the coat flanked by the cuts (of a 10 mm width) was pulled to the opposite direction horizontally with a tensile strength tester to read the peeling load. The larger the load, the more excellent the serviceability of the coat.

[III] Experimental Examples

Examples 1–6 and Comparative Examples 1–5

The components (a)–(d) were taken in proportions shown in Table 1 and blended amply in a tumbler mixer.

Then, the blend was kneaded and granulated with a high-speed biaxial extruder (KOBE SEIKO K.K.; KCM) to give pellets, which were fed into an injection molding machine to evaluate the injection molding processability, and to prepare test pieces for evaluation of physical properties and coating characteristics.

The results of the evaluation are shown in Table 2.

As shown in Table 2, all of the resin compositions having compositions shown in Examples 1–6 exhibited good physical property balance, injection molding processability and paintability.

On the other hand, the compositions shown in Comparative Examples 1–4 showed poor performance balance. Table 1

TABLE 1

Propylene resin compositions

| Item No. | Component (a) Block copolymer Type | part by weight | Component (b) Talc Type | part by weight | Component (c) Ethylene-α-olefin copolymer Type | part by weight | Component (d) Fatty amide derivative Type | part by weight |
|---|---|---|---|---|---|---|---|---|
| Examples | | | | | | | | |
| 1 | a-1 | 100 | b-1 | 28 | c-1 | 45 | — | — |
| 2 | a-1 | 100 | b-2 | 28 | c-1 | 45 | — | — |
| 3 | a-1 | 100 | b-2 | 14 | c-1 | 29 | — | — |
| 4 | a-1 | 100 | b-3 | 28 | c-1 | 45 | — | — |
| 5 | a-1 | 100 | b-2 | 28 | c-1 | 45 | d-1 | 0.3 |
| 6 | a-1 | 100 | b-2 | 14 | c-1 | 29 | d-2 | 0.3 |
| Comparative Examples | | | | | | | | |
| 1 | a-2 | 100 | b-1 | 28 | c-1 | 45 | — | — |
| 2 | a-1 | 100 | b-4 | 28 | c-1 | 45 | — | — |
| 3 | a-1 | 100 | b-1 | 28 | c-2 | 45 | — | — |
| 4 | a-1 | 100 | b-1 | 28 | c-3 | 45 | — | — |

TABLE 2

| | Evaluation | | | | |
|---|---|---|---|---|---|
| | Physical property balance | | Injection molding processability | | Painta- |
| Item No. | Thermal deformation temperature (° C.) | −30° C. Dart impact strength (J) | Molda-bility | Appearance (flow marks, etc) | bility Peel strength (g/cm) |
| Examples | | | | | |
| 1 | 116 | 7.0 | ◯ | ◯ | 1,010 |
| 2 | 119 | 8.7 | ◯ | ◯ | 1,170 |
| 3 | 118 | 9.1 | ◯ | ◎ | 1,080 |
| 4 | 118 | 8.9 | ◯ | ◯ | 1,200 |
| 5 | 118 | 9.0 | ◎ | ◎ | 1,210 |
| 6 | 118 | 9.5 | ◎ | ◎ | 1,050 |
| Comparative Examples | | | | | |
| 1 | 113 | 6.5 | X | X | 970 |
| 2 | 110 | 3.9 | ◯ | X | 830 |
| 3 | 115 | 5.5 | X | Δ | 1,030 |
| 4 | 112 | 4.1 | ◯ | Δ | 610 |

The propylene resin composition of the present invention requires no degreasing treatment with trichloroethane and has high level paintability, high physical property balance (heat resistance and impact strength at low temperature), and more excellent injection molding processability (specifically, excellent fluidity and mold handling ability as well as good appearance of a molded product which hardly generates flow marks), so that the propylene resin composition of the present invention forms a group of very important materials for forming a variety of industrial articles or parts thereof including automobile parts such as a bumper.

What is claimed is:

1. A propylene resin composition consisting essentially of
   component (a) which is a propylene-ethylene block copolymer comprising 85–95% by weight of a crystalline polypropylene homopolymer portion (unit A) and 5–15% by weight of an ethylene-propylene random copolymer portion (unit B) having an ethylene content of 30–60% by weight, the melt flow rate of the total component (a) being 50–500 g/10 min at 230° C. and 2.16 kg, in an amount of 100 parts by weight;
   component (b) which is talc having an average particle diameter of 1.5–10 μm and an average aspect ratio of 4 or more, in an amount of 10–60 parts by weight; and
   component (c) which is an ethylene-1-octene copolymer comprising 20–50% by weight of 1-octene units, and having a density of 0.86–0.89 g/cm³ and a tensile strength at break of 10 MPa or more in an amount of 10–60 parts by weight.

2. The propylene resin composition according to claim 1, wherein the crystalline polypropylene homopolymer portion (unit A) has a density of 0.9070 g/cm³ or more.

3. The propylene resin composition according to claim 1, wherein the component (b) is talc which has been subjected to surface treatment with 0.2–3 parts by weight of a metal salt represented by the chemical formula [1] per 100 parts by weight of the component (b)

$$(RCOO)_2X \qquad [1]$$

wherein X represents Zn, Mg or Ca, and R represents a monovalent hydrocarbon group having a molecular weight of 290–500.

4. The propylene resin composition according to claim 1, wherein the component (b) is talc powder which has been compressed to deaerate at a compression ratio of 1.10 or more to give an apparent specific volume of 2.50 ml/g or less.

5. The propylene resin composition according to claim 1, wherein the composition further consists essentially of a fatty amide compound as a component (d) in a proportion of 0.1–1 part by weight per 100 parts by weight of the component (a).

6. The propylene resin composition according to claim 1, wherein the ethylene-1-octene copolymer has been polymerized with a metallocene catalyst.

7. The propylene resin composition according to claim 1, wherein component (c) has a tensile strength at break of about 12 MPa or more.

8. The propylene resin composition according to claim 1, wherein component (c) has a tensile strength at break of about 15 to about 50 MPa.

* * * * *